US012664071B1

(12) United States Patent
Walter et al.

(10) Patent No.:  US 12,664,071 B1
(45) Date of Patent:  Jun. 23, 2026

(54) LOGGING TOOL

(71) Applicant: Hud Software Platforms Ltd., Tel Aviv (IL)

(72) Inventors: May Walter, Tel Aviv (IL); Roee Adler, Tel Aviv (IL); Afic Jushua, Tel Aviv (IL); Shani Armon, Modiin-Macabim-Reut (IL)

(73) Assignee: HUD SOFTWARE PLATFORMS LTD., Tel Aviv (IL)

( * ) Notice: Subject to any disclaimer, the term of this patent is extended or adjusted under 35 U.S.C. 154(b) by 0 days.

(21) Appl. No.: 19/233,338

(22) Filed: Jun. 10, 2025

(51) Int. Cl.
G06F 11/362          (2025.01)
(52) U.S. Cl.
CPC ................................. G06F 11/364 (2013.01)
(58) Field of Classification Search
None
See application file for complete search history.

(56) References Cited

U.S. PATENT DOCUMENTS 6,282,701 B1 * 8/2001 Wygodny ........... G06F 11/3698
709/224
7,251,810 B1     7/2007 Nolte 2007/0283331 A1     12/2007 Peitrek
2010/0064279 A1      3/2010 Stewart
2013/0024731 A1 *    1/2013 Shochat .............. G06F 11/3612
714/38.1
2014/0215444 A1 *    7/2014 Voccio ................ G06F 11/3644
717/128
2020/0311268 A1 *   10/2020 Kostyushko .......... G06F 21/561
2023/0325299 A1     10/2023 Nelson et al.
2024/0028498 A1 *    1/2024 Desai ................... G06F 11/364

FOREIGN PATENT DOCUMENTS

EP          2 390 790 A1     11/2011

* cited by examiner

*Primary Examiner* — Andrew M. Lyons
(74) *Attorney, Agent, or Firm* — Myers Wolin, LLC

(57)          ABSTRACT

A logging tool system, product and method for employing within a live production environment, the logging tool comprising: a mock stack configured to track function executions of a computer program; an endpoint module configured to track invocations of endpoints; and a plurality of hooks embedded within functions of interest of the computer program, wherein the plurality of hooks is configured to interact with the mock stack and the endpoint module during execution of the computer program, wherein the logging tool is configured to determine, for an invocation of a function, whether a call flow of the function is firstly encountered, and wherein the logging tool is configured to determine, based on the endpoint module, at least one endpoint that triggered the invocation of the function.

20 Claims, 3 Drawing Sheets

LOGGING TOOL

TECHNICAL FIELD

The present disclosure relates to computer systems in general, and to logging program executions, in particular.

BACKGROUND

Understanding the execution flow of a program is critical for identifying performance bottlenecks, debugging errors, and optimizing resource utilization.

However, existing approaches to capturing this flow face significant limitations. For example, call stacks can be resource consuming, and traditional Application Performance Monitoring (APM) tools typically rely on sampling techniques, which can miss rare but critical execution paths. At the same time, manual logging by developers remains a time-consuming and error-prone process.

SUMMARY

One exemplary embodiment of the disclosed subject matter is a logging tool employed within a live production environment, the logging tool comprising: a mock stack, the mock stack is configured to track function executions of a computer program and to maintain indications of the function executions within a memory region, the memory region belonging to a process executing the computer program, the memory region is separate from memory allocated to a call stack of the process; an endpoint module, the endpoint module is configured to track invocations of endpoints and to maintain indications of the invocations within the memory region; and a plurality of hooks, the plurality of hooks are embedded within functions of interest of the computer program, wherein the plurality of hooks is configured to interact with the mock stack and the endpoint module during execution of the computer program, wherein the logging tool is configured to determine, for an invocation of a function that is hooked by a hook of the plurality of hooks, whether a call flow of the function is firstly encountered, wherein the call flow of the function comprises a flow from a calling function of the functions of interest that invoked the function to the function, wherein the call flow of the function is identified based on the mock stack, and wherein the logging tool is configured to determine, based on the endpoint module, at least one endpoint that triggered the invocation of the function.

Optionally, the logging tool is configured to count a number of occurrences of the call flow within a reporting time window, wherein the number is reported to a server after the reporting time window elapses.

Optionally, the logging tool is configured to add an indication of the function to the mock stack upon the invocation of the function, and to remove the indication upon execution termination of the function.

Optionally, the logging tool is configured to add an indication of an endpoint to the endpoint module upon invocation of the endpoint, and to remove the indication after one or more chains of function calls invoked by the endpoint, complete a termination.

Optionally, the endpoint comprises an API; a service entry point; a cron job; a queue management service; a webhook; or the like.

Optionally, the function is part of a chain of function calls that is triggered by multiple endpoints, wherein the logging tool is configured to add indications of the multiple endpoints to the endpoint module and to associate the function with the multiple endpoints.

Optionally, the mock stack and the endpoint module are implemented as first and second global variables, respectively, within a data segment of the process.

Optionally, the mock stack and the endpoint module are maintained within a heap of the process.

Optionally, the indications of the function executions comprise unique identifiers that uniquely identify each of the functions of interest upon execution.

Optionally, the logging tool is further configured to: upon determining that the call flow of the function is firstly encountered, perform a complete data collection of an execution of the function; upon determining that a subsequent call flow of the function was already encountered, setting a sampling rate for the function, thereby performing an incomplete data collection, the subsequent call flow comprises the flow from the calling function to the function, the subsequent call flow is invoked after the call flow.

Optionally, the sampling rate for the function is configured to gradually decrease as a number of invocations of the call flow increases.

Optionally, the logging tool is further configured to: apply a first sampling rate for the function; and upon determining that an exception occurs during an execution of the function, adjust the first sampling rate to a second sampling rate, the second sampling rate greater than the first sampling rate.

Optionally, the logging tool is further configured to: selectively sample performance data of invocations of the function over a defined time window; aggregate sampled performance data over the defined time window, thereby obtaining aggregated data, wherein the aggregated data comprises at least the number of occurrences of the call flow and performance data of the occurrences of the call flow; and transmit the aggregated data to a server.

Optionally, the performance data comprises: an overall average execution time of the function over all call flows and endpoints; an average execution time of the function for the call flow; an average execution time of the function for the endpoint; a percentile execution time of the function over all call flows and endpoints; a percentile execution time of the function for the call flow; a percentile execution time of the function for the endpoint; computational resource consumption of the function; a memory usage of the function; or the like.

Optionally, the method further comprises determining a total invocation count of the function; determining a sampled invocation count of the function; and calculating the overall average execution time based on a ratio between the total invocation count and the sampled invocation count.

Optionally, the plurality of hooks comprises a plurality of pre-hooks and post-hooks, wherein the pre-hooks and post-hooks are used to instrument the functions of interest, wherein the pre-hooks are configured to register the functions of interest to the mock stack, wherein the post-hooks are configured to remove registrations of the functions of interest after their executions terminate.

Optionally, the plurality of hooks comprises a mid-hook that is embedded prior to an asynchronous primitive of the function, wherein the mid-hook is configured to be invoked mid-execution of the function, wherein the mid-hook is configured to extract an indication of the function and/or a caller of the function from the mock stack before the asynchronous primitive is executed, and to restore the indication after termination of the asynchronous primitive.

Optionally, the functions of interest are selected by a user.

Another exemplary embodiment of the disclosed subject matter is a system comprising a processor and coupled memory, said processor is adapted to execute a logging tool within a live production environment, said processor being adapted to: instrument a computer program with a plurality of hooks, the plurality of hooks is embedded within functions of interest of the computer program; maintain a mock stack in a memory region of the coupled memory, the memory region belonging to a process executing the computer program, the memory region is separate from memory allocated to a call stack of the process, wherein the mock stack is configured to track function executions of the computer program and to maintain indications of the function executions; maintain an endpoint module in the memory region, the endpoint module is configured to track invocations of endpoints and to maintain indications of the invocations, wherein the plurality of hooks is configured to interact with the mock stack and with the endpoint module during execution of the computer program; determine, for an invocation of a function that is hooked by a hook of the plurality of hooks, whether a call flow of the function is firstly encountered, wherein the call flow of the function comprises a flow from a calling function that invoked the function to the function, wherein the call flow of the function is identified based on the mock stack; and determine, based on the endpoint module, at least one endpoint that triggered the invocation of the function.

Yet another exemplary embodiment of the disclosed subject matter is a computer program product comprising a non-transitory computer readable medium retaining program instructions, which program instructions when read by a processor, cause the processor to execute a logging tool within a live production environment, said processor being adapted to: instrument a computer program with a plurality of hooks, the plurality of hooks is embedded within functions of interest of the computer program; maintain a mock stack in a memory region of the coupled memory, the memory region belonging to a process executing the computer program, the memory region is separate from memory allocated to a call stack of the process, wherein the mock stack is configured to track function executions of the computer program and to maintain indications of the function executions; maintain an endpoint module in the memory region, the endpoint module is configured to track invocations of endpoints and to maintain indications of the invocations, wherein the plurality of hooks is configured to interact with the mock stack and with the endpoint module during execution of the computer program; determine, for an invocation of a function that is hooked by a hook of the plurality of hooks, whether a call flow of the function is firstly encountered, wherein the call flow of the function comprises a flow from a calling function that invoked the function to the function, wherein the call flow of the function is identified based on the mock stack; and determine, based on the endpoint module, at least one endpoint that triggered the invocation of the function.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
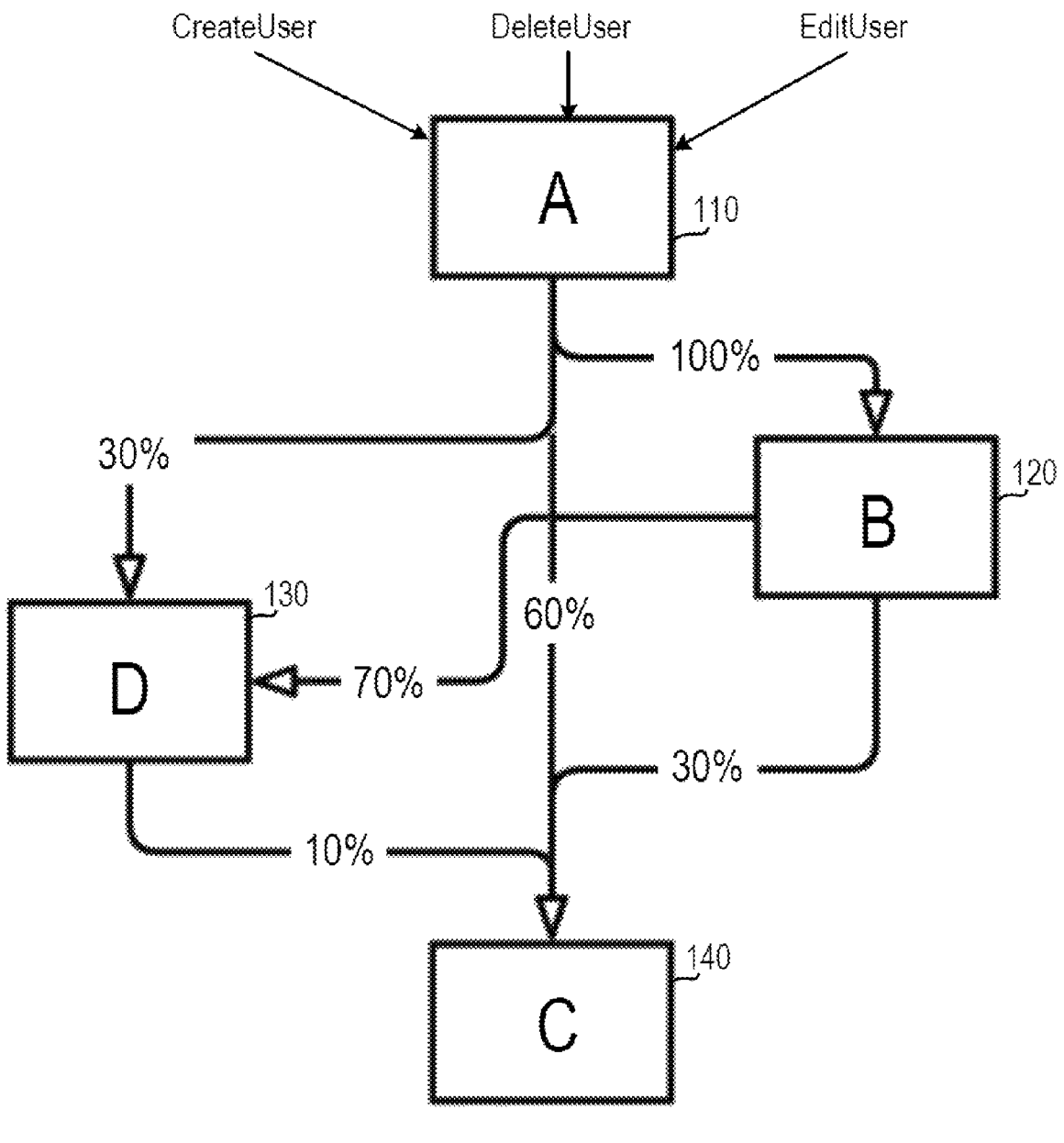
FIG. 1 shows an exemplary call flow graph, in accordance with some exemplary embodiments of the disclosed subject matter.

One technical problem dealt with by the disclosed subject matter is tracking function calls of a program execution. For example, it may be desired to track, for each function of interest that is executed in the production, who is its calling function.

Another technical problem dealt with by the disclosed subject matter is tracking flows of function calls. For example, it may be desired to provide a call graph that reflects call flows to functions of interest.

Yet another technical problem dealt with by the disclosed subject matter is tracking asynchronous function calls, where event loops and non-sequential execution disrupt direct caller-callee relationships, resulting in incomplete or disconnected call graphs.

Yet another technical problem dealt with by the disclosed subject matter is the identification of endpoint sources for function calls and executions. An endpoint represents the entry point to a service, a specific functionality of an Application Programming Interface (API) call, or the like. For example, in a user management system, endpoints may comprise operations such as "create user," "update user," and "delete user." The endpoint may initiate a chain of function calls, and may serve as the initial point of interaction with an API, defining the particular service or action being requested.

Traditional methods for tracking function calls, such as stack traces, generate comprehensive snapshots of the call stack at specific execution points, such as errors or exceptions. In some exemplary embodiments, a stack trace may list all the active stack frames, showing the sequence of function calls that led to that point. In some cases, each stack frame in the stack trace may comprise information specific to that function's execution, such as local variables, parameters, the return address after the function completes, a pointer to the previous stack frame, or the like. Stack frames are managed in a Last-In-First-Out (LIFO) manner on the call stack, meaning a new frame is pushed onto the stack when a function is called and popped off when the function returns.

Utilizing stack traces, such as by retrieving or generating them, may have multiple drawbacks. For example, retrieving stack traces may incur significant computational overhead, may be memory-intensive, complex, and slow. Stack traces often fail to capture endpoint sources and critical contextual information of a program execution, such as the dynamics of asynchronous operations prevalent in interpreter-based languages such as JavaScript™ running on Node.js™. For example, stack traces do not trace callers of asynchronous operations, where event loops and non-sequential execution disrupt direct caller-callee relationships, resulting in incomplete or disconnected call graphs.

It may be desired to overcome drawbacks of stack traces, and enable users to identify function call flows and endpoint sources, even in cases of asynchronous operations. For example, it may be desired to generate and present such information efficiently and swiftly, without utilizing excess computational resources.

Yet another technical problem dealt with by the disclosed subject matter is tracking performance metrics of function executions. In some exemplary embodiments, performance monitoring is a crucial aspect of software development and maintenance. In traditional software development practices, developers often need to manually add logging statements throughout their code to track function calls and their performance metrics. This process of "actively logging data" requires the developer to identify which functions or code sections need logging, write and insert logging statements, manage the logged data, or the like, which may be time intensive, increase the workload, and result in excessive and inefficient logging. It may be desired to overcome such drawbacks and allow users such as developers to automatically gather important performance metrics regarding function calls, performance, execution times, or the like.

Yet another technical problem dealt with by the disclosed subject matter is tracking performance metrics of function executions with reduced overhead. Collecting detailed information for every function call can significantly hinder an application's performance, especially in production environments with high load. It may be desired to enhance the trade-off between comprehensive data collection and system performance.

One naïve solution is using sampling tools to monitor the performance of applications using statistical rules, such as sampling a certain percent of executions, instead of accumulating detailed information for every function call. For example, conventional Application Performance Monitoring (APM) tools rely on sampling techniques that may miss rare but critical execution paths, and manual logging by developers is time-consuming, error-prone, and impractical for large-scale systems. It may be desired to overcome such drawbacks.

Yet another technical problem dealt with by the disclosed subject matter is tracking performance metrics of function executions with reduced overhead, without missing any call flow. It may be desired to track performance metrics of all flows of function calls, without missing rare or critical execution paths.

Yet another technical problem dealt with by the disclosed subject matter is efficiently tracking the performance metrics, endpoint sources, and call flows of all functions of interest without significantly impacting production environment performance. For example, a significant impact may refer to a performance slowdown exceeding a predefined threshold.

One technical solution provided by the disclosed subject matter is utilizing a data structure separate from the stack trace, to track function calls, flows thereof, and endpoints. Code snippets may be used to hook or wrap the program code, configuring it to interact with the data structure. For example, hooks may be used to register invoked functions in the data structure, to unregister functions from the data structure upon termination, to sample and/or measure performance metrics, to determine whether to sample performance metrics, or the like.

In some exemplary embodiments, an automatic logging tool, composed of the data structure and the hooks, may utilize its components in order to track function calls, flows thereof, endpoints, and performance metrics. In some exemplary embodiments, the logging tool may maintain the data structure in the process memory, such as in a region of Random-Access Memory (RAM) allocated to the running process. For example, the data structure may reside in the process's address space, e.g., in the heap, in the data segment, or the like. In some exemplary embodiments, the data structure may be maintained in a memory region that is distinct from the call stack.

In some exemplary embodiments, the data structure of the logging tool may be generated to comprise at least a "mock stack", which may be used to register and unregister function executions. For example, a hook may be embedded into each function of interest, and may announce the function to the mock stack when starting and ending execution. For example, functions or other code elements may be registered to the mock stack by the hooks reporting a Unique Identifier (UID) string that uniquely identifies the respective functions. For example, the UID may be assigned in advance, generated using a hash function, may comprise a manipulation of properties of the function such as a manipulation of its name and/or parameters, or the like.

In some exemplary embodiments, the mock stack may be configured to function as a stack, such as using a LIFO order for maintaining function calls, although it may be completely distinct and unrelated to the call stack of the process memory. For example, the mock stack may reside in the process's heap, in the data segment as a global variable, or the like. In some exemplary embodiments, the hooks or wrappers that interact with the mock stack may be generated to comprise "no-throw" logic that does not change a user flow, so that the wrappers will not cause noticeable side effects to the user logic reflected in the code.

In some exemplary embodiments, the logging tool may utilize the mock stack as a type of "Markov stack", identifying for each invoked function its previous function from the mock stack. For example, a hook within each function may be activated upon invocation of the function, read the top entry of the mock stack (indicating the last invoked function), register the function to the mock stack, and report the previous function (the calling function) and current function to the logging tool. According to this example, the logging tool may record, for the invoked function, the function execution, the calling function, and a flow from the calling function to the current function, without necessarily associating the function with any prior functions that were invoked prior to the calling function. For example, in the case of a function call chain of A-B-C, in which A calls B, and B calls C, the logging tool may associate C only with B and not with A. In some exemplary embodiments, this "flattening" the chain of calls to only the previous function call, enables to maintain the call graph while reducing the overhead dramatically, compared to call stack.

In some exemplary embodiments, the logging tool may accumulate and aggregate information from the mock stack, over a defined time window, and generate performance metrics therefrom. For example, the logging tool may utilize a logging manager, a profiler, a tracing controller, or the like, to periodically accumulate and aggregate performance information. In some exemplary embodiments, the logging manager may utilize a log buffer, a list, a queue, a performance table mapping function identifiers to start/end times and counters, trees, graphs, or the like, to aggregate and/or record aggregated data. In some exemplary embodiments, the logging manager may utilize one or more counters to count the number of call flows of each function, the number of executions of the function per flow, the overall number of executions of the function, or the like. For example, the counters may be implemented in the process's heap, in the data segment, or the like.

In some exemplary embodiments, in addition to the mock stack, the data structure of the logging tool may maintain an "endpoint module" representing endpoints that serve as an entry point for the active execution path. For example, endpoints may represent specific functionalities of an API call such as updating a client record in a backend of a user management system, registering a client, or deleting the client. As another example, endpoints may represent points of interaction such as interactions with APIs, service entry points, web hooks, an event queue, a cron job, queue management services, or the like, defining the particular service or action being requested. As another example, endpoints may represent one or more APIs of a single server, of multiple servers, or the like, from which a function call may originate.

In some exemplary embodiments, the endpoint module may reside in the process's heap, as a global variable in the data segment, or the like, e.g., in the same memory location as the mock stack. In some exemplary embodiments, the endpoint module may indicate names, identifiers, or the like, of endpoints that are a source of an active control flow resulting in a current function execution.

In some exemplary embodiments, during runtime, the logging tool may monitor every time an endpoint is invoked, accessed, or the like, and record the endpoint in the memory as an entry of the endpoint module. For example, endpoint invocations may be monitored or extracted from a program execution using one or more frameworks such as Express™, Fastify™, Koa™, or the like, which may be hooked to expose and track which endpoint is active. In some cases, endpoint invocations may be monitored by hooking the user code (e.g., with user-defined handlers), instrumenting framework code such as Fastify™, a combination thereof, or the like.

For example, the instrumentation of framework code may comprise instrumenting a middleware stack of the framework's internals, a router dispatch logic thereof, an internal request handler registration, or the like. According to this example, since the framework code could execute before the user code, the instrumentation of framework code may be performed as close as possible to the user code (to preserve accurate endpoint context during logical context switches). In some exemplary embodiments, one or more hooks or wrappers embedded in the program, including the user code and/or endpoint-routing framework, may be configured to track the active endpoints during execution. In some exemplary embodiments, in case a flow invoked by the endpoint terminates, the logging tool may remove the endpoint from the endpoint module, mark it as inactive, or the like.

In some exemplary embodiments, the logging tool may utilize one or more hooks to associate each called function with its endpoints, based on the active endpoints that are indicated by the endpoint module as active during the invocation of the function. In some exemplary embodiments, functions may originate from more than a single endpoint, e.g., as depicted in FIG. 1. For example, a function may originate from first and second API calls, simultaneously.

In some exemplary embodiments, the logging tool may accumulate and aggregate information from the endpoint module, over a defined time window, and generate performance metrics therefrom. For example, the logging tool may periodically accumulate and aggregate performance information based on the endpoint module. In some exemplary embodiments, the logging manager may utilize one or more counters to count the number of endpoint flows of each function, the number of executions of the function per flow, or the like.

In some exemplary embodiments, the logging tool may utilize the data structure, including the mock stack and the endpoint module, instead of using the call stack. For example, the mock stack may be utilized instead of loading the full stack trace at each point of interest, e.g., when searching for a caller, searching for an endpoint, obtaining performance metrics, or the like. In some exemplary embodiments, the usage of the data structure may constitute an efficient and lightweight memory management approach to function call tracking, since it may have light maintenance and may not require to fetch, access, or generate resource-consuming stack traces.

Referring now to FIG. 1 showing an exemplary call flow graph, in accordance with some exemplary embodiments of the disclosed subject matter.

In some exemplary embodiments, the logging tool may track a plurality of function calls. For example, the logging tool may track an invocation of Function 110 (denoted "A"), using the registration mechanism in the mock stack. Function 110 may call Functions 120, 130, and 140 (denoted "B", "D", and "C", respectively), all of which may register and unregister from the mock stack. As depicted in FIG. 1, Function 120 may invoke Functions 130 and 140, and Function 130 may invoke Function 140.

In some exemplary embodiments, the logging tool may accumulate, for each invoked function, information regarding its performance, its caller, and its endpoint. In some exemplary embodiments, the tracking mechanism used to track endpoints may be separate and distinct from the tracking mechanism used to track function calls, and statistics gathered for both flows may be gathered separately. For example, for a tracked call flow, the performance parameters may comprise performance data regarding a flow of two function executions, such as an execution time, an average execution time, an average execution time per call flow, an average resource consumption, input/output data, calling functions that invoked the executions, ratios of each calling function, memory usage, inputs to callees, outputs from callees, or the like. As another example, for an active endpoint that invoked the function, the performance data may comprise an execution time of the function when invoked by the active endpoint, an average execution time of the function when invoked by the active endpoint, an average resource consumption of the function when invoked by the active endpoint, ratios of each endpoint that invoked the function, memory usage of the function when invoked by the active endpoint, or the like.

In some exemplary embodiments, instead of measuring properties of all function executions, which may be resource intensive, the measurements may be sampled according to a sampling rate, providing a partial coverage of the function executions. As an example, in case a sampling rate of a function execution is set to a value of $\frac{1}{5}$, this indicates that performance data for executions of the function is gathered once for every 5 function executions in the production environment. In some exemplary embodiments, the sample rates may be applied according to heuristic rules, such as in order to ensure that all call flows are captured, and that executions that are useful for statistical analyses are accumulated.

In some exemplary embodiments, the sampling rate for each function may be set statically or dynamically. In some cases, the sampling rate may be dynamically adjusted based on heuristics, a statistical analysis of the logging data, or the like. In some exemplary embodiments, the sampling rate may be linearly correlated with the execution time and memory usage. For example, reducing the sampling rate may reduce the resource consumption and execution time. In some cases, reducing the sampling rate may adversely affect the coverage and precision of the performance data.

In some exemplary embodiments, an enhanced balance between resource consumption and call graph coverage may be obtained, e.g., by dynamically adjusting the sampling rate. For example, the sampling rate may be reduced for stable executions, while new call flows (e.g., firstly encountered call flows) may be always captured and sampled. In some exemplary embodiments, the logging tool may keep track of call flows, and upon identifying a new call flow, e.g., identifying a first invocation of Function 140 by Function 130, the logging tool may dynamically determine to collect the performance data of the execution, e.g., via its hooks. In some cases, the call flow may be identified in response to a registration of the called function in the mock stack, which may be performed by an initial hook of the function before the function's code is executed. In response to the registration of the function's UID, e.g., UID1, the logging tool may identify the previous UID in the mock stack, e.g., UID2, and compare the flow of UID2-UID1 with previous recorded call flows in the process's memory.

For example, the call flows may be recorded as one or more global variables in the data segment, in the heap memory, or the like, and the decision to adjust the sampling rate may be made at a hook that is injected in the function's code, before, during, or after the function's execution. In some exemplary embodiments, the sampling rate may be set before an execution is measured, or after an execution is measured. For example, in case the sampling rate is set after an execution is measured, the measurement may be determined to be discarded or not based on the sampling rate.

In some exemplary embodiments, the sampling rate, or verbosity, may be dynamically adjusted based on heuristic logic, heuristic rules, or the like. In some exemplary embodiments, instead of setting a sampling rate using pure statistics, the sampling rate may be set using heuristic logic that relates to production behavior. For example, the sampling rate may be defined to be set or adjusted based on heuristic rules such as "if execution of a specific code element fails", "if a duration of an execution of a code element is above a threshold", "if a version of a code element changed in a live production environment in which it is deployed", or any other rules. As another example, the sampling rate of a function may be defined to be increased by 50%, to 100%, or the like, in case the function throws an exception. In some exemplary embodiments, the ability to utilize heuristic rules at runtime instead of mere statistics may be derived from the hooks being within the executed function, before the function is fully or partially executed, enabling dynamic decision making and tracking without making any code or version changes to the base code.

In some exemplary embodiments, reducing the sampling rate for stable executions may reduce the overhead and increase efficiency. As an example, functions that run infrequently in the production runtime environment (e.g., 10 times per day), may have less stable performance parameters compared to more frequently executed functions (e.g., 5,000 times per minute), and such function may be assigned with a higher sampling rate.

In some exemplary embodiments, in case of capturing an exception, error, or the like, the sampling rate may be increased. For example, a function that throws an exception may be identified by a post-hook that is configured to be executed after the function completes its execution, e.g., even in case the function is not sampled. According to this example, the sampling rate of the function may be increased to a high sampling rate, e.g., above a threshold, in response to identifying that an exception was thrown. As another example, hooks may be embedded within exception handlers and may measure and report all invocations of the exception. As another example, hooks embedded within exception handlers may be configured to sample only invocations of functions of interest (e.g., functions selected to be hooked, instrumented, or the like).

In some exemplary embodiments, sampled executions may be collected by the logging tool, and processed, aggregated, or the like, to determine one or more performance parameters. In some exemplary embodiments, the performance parameters may be reported to a server, a backend, a cloud, or the like. In some exemplary embodiments, aggregated statistics such as the performance parameters may be reported periodically, such as every 2 seconds, every 5 seconds, every minute, or any other predefined time window. For example, a live call graph with the aggregated call flows may be periodically generated and provided to the server from the production environment. In some cases, after the sampled performance parameters are reported to the server, one or more data records may be cleaned, initialized, reset, or the like. For example, the call flow counters may be initialized, execution time measurements may be initialized, or the like.

In some exemplary embodiments, to ensure the statistics accurately calibrate or compensate for the bias of sampling rate, the number of executions of a given code element may be reported to the server alongside the sampling rate that was used. For example, in case a function was executed 100 times with a sampling rate of ⅕, and was executed 200 times with a sampling rate of 1/10, this data may be reported along with the respective performance statistics in order to accurately approximate the statistics.

Referring back to FIG. 1, the logging tool may aggregate, for Function 140, statistical data representing the ratio of call flows that reach Function 140 from Function 110 (e.g., 60%), the ratio of call flows that reach Function 140 from Function 120 (e.g., 30%), and the ratio of call flows that reach Function 140 from Function 130 (e.g., 10%). As another example, the logging tool may aggregate, for Function 140, statistical data representing properties of each of the above call flows, e.g., an average execution time.

In some exemplary embodiments, the logging tool may associate each function execution, call flow, or the like, with active endpoints. For example, in the case of FIG. 1, three endpoints invoke Function 110: "CreateUser", "DeleteUser", and "EditUser". According to this example, all call flows that are initiated by Function 110 may be recorded as being invoked by these endpoints.

In some exemplary embodiments, performance parameters, or statistics, may be calculated and analyzed separately for call flows and for endpoints. For example, in case of a performance parameter that measures an average execution time of Function 140, the performance parameter may be calculated once for each call flow reaching Function 140, and once for each endpoint that invoked Function 140 indirectly or directly, e.g., "CreateUser", "DeleteUser", and "EditUser". For example, the average execution time of Function 140, when calculated per endpoint, may be agnostic of the call flow of Function 140, of calling functions of Function 140, or the like.

In one scenario, the average execution time of Function 140 may be estimated to be 1 second overall, 60 seconds when called from Function 110, 0.001 seconds when called from Function 120, and 1.5 seconds when called from Function 130. In addition to the call flow analysis, the average execution time of Function 140 may be estimated for each endpoint. For example, the average execution time of Function 140 may be estimated to be 0.7 seconds when invoked by the "CreateUser" endpoint, 2 seconds if invoked by the "DeleteUser" endpoint, and 1 second if invoked by the "EditUser" endpoint.

In some exemplary embodiments, the call flows for which the logging tool may accumulate statistics, may include call flows between two functions: the caller and callee, without relating to any previous calling functions in the chain of function calls. For example, in the case of FIG. 1, the logging tool may determine the ratio of call flows that reach Function 140 from Function 130, without calculating performance parameters based on ancestors of Function 130, e.g., Functions 110 and 120. For example, the logging tool may not calculate a different average execution time for call flows that reach Function 140 from Function 130 through Function 110, and for call flows that reach Function 140 from Function 130 through Function 120, thereby reducing computational and memory resources of the logging tool. In other cases, the association of a function to its previous callers may be limited to two levels, three levels, or the like.

In some exemplary embodiments, the logging data may be gathered, aggregated, managed, or the like, automatically without requiring manual intervention. In some exemplary embodiments, the logging data may be processed to determine performance parameters and/or metrics automatically without requiring manual intervention, and may be presented to developers. In some exemplary embodiments, the performance parameters may be crucial for developers to understand the flow of their application and identify from where potential bottlenecks or issues are stemmed from. For example, performance parameters derived from the logging data may be integrated within an Integrated Development Environment (IDE), such as to present them as insights to a developer using the IDE. For example, in case a code element that is being designed via the IDE has a bug, the performance parameters may indicate that the code element is invoked by thirty different endpoints, which may enable the programmer to understand the situation and perform informed decisions regarding management of the identified bug.

In some exemplary embodiments, the logging tool may be used to track synchronous and asynchronous executions. In some exemplary embodiments, in synchronous code, function calls may occur sequentially and the calling function of each invoked function may be directly traceable via the mock stack. In some exemplary embodiments, in asynchronous code, tasks may be scheduled by the runtime's event loop (e.g., in JavaScript's Node.js™ or browser environments) rather than directly called by another function. In some exemplary embodiments, the event loop may be a runtime mechanism, and may not be part of the application's call stack. In some exemplary embodiments, asynchronous code may comprise a logical context switch (e.g., as opposed to an operating system (OS) context switch). In some exemplary embodiments, in asynchronous code, function executions may be triggered by events such as timers, Input/Output (I/O) completion, user actions, Hypertext Transfer Protocol (HTTP) responses, HTTP requests, or the like, disrupting the direct caller-callee relationship.

In some exemplary embodiments, tracking asynchronous ("a-sync" or "async") executions using the call stack may be challenging due to the absence of the caller function that triggered the a-sync execution from the respective stack trace, complicating call graph generation in profiling tools. Stack traces rely on a continuous call stack, but asynchronous executions create disconnected execution contexts. For example, event handlers invoked by the event loop, not user code, may result in stack traces with no caller. As another example, async operations such as "await" involve a logical context switch within the event loop: the async function pauses and yields to the event loop, resuming when the awaited promise resolves, which clears the stack and omits caller information from post-await traces. According to this example, this loss of call stack context may be more pronounced when the awaited task is invoked directly by the event loop (e.g., a top-level async function call).

In some exemplary embodiments, the logging tool may overcome the challenge of tracking asynchronous executions by preserving both caller function context and endpoint context across asynchronous boundaries. In some exemplary embodiments, the logging tool may utilize the mock stack and the endpoint module to track asynchronous executions, using the hooks that are embedded in the user code to restore both contexts.

In some exemplary embodiments, each asynchronous function may be composed of synchronous and asynchronous primitives. In some exemplary embodiments, one or more mid-hooks (also referred to as "async boundary hooks") may be embedded within a function, such as prior to the asynchronous primitives, after one or more synchronous primitives, or the like. In some exemplary embodiments, to ensure accurate tracking, the mid-hooks may be inserted as close as possible to the asynchronous primitives, e.g., in order to minimize context loss caused by logical context switches. In some exemplary embodiments, the mid-hooks may be configured to be invoked mid-execution in order to maintain the mock stack's state (e.g., the caller function) and the endpoint module's state between the logical context switches.

In some exemplary embodiments, the mid-hooks wrapping the asynchronous primitives may be configured to capture state information, such as the top entry of the mock stack (representing the immediate caller) and one or more currently active endpoints, prior to the context switch. For example, the mid-hooks may ensure that the function is registered to the mock stack prior to the asynchronous primitives, and capture its immediate caller and/or an identifier of the function itself from the mock stack. The mid-hooks may be configured to capture a full or partial content of the mock stack and endpoint module before the asynchronous primitives are executed, and restore the content after the termination of the asynchronous primitives. Upon resumption of the function execution, the mid-hook may restore the captured state, re-establishing the association between the resumed function and its original calling function and triggering endpoint.

For example, a mid-hook may be configured to capture the top entry of the mock stack before the asynchronous primitives are executed, and re-enter the top entry to the mock stack after the termination of the asynchronous primitives. As another example, the endpoint context may be captured before the asynchronous primitives are executed, and the endpoint module's state (e.g., the active endpoint) may be maintained after the termination of the asynchronous primitives. By wrapping asynchronous constructs with mid-hooks, the caller-callee relationships may be preserved even across asynchronous execution boundaries.

In some exemplary embodiments, the logging tool may track asynchronous executions within interpreter-based languages such as JavaScript™. For example, such language may utilize a Just In Time (JIT) compilation mechanism. In some exemplary embodiments, in case the runtime environment is a single-thread environment, such as in the case of a Node.js™ runtime environment, a-sync code may be tracked by "popping" or removing a most recent function from the mock stack, performing the logical context switch, and re-registering the function in the mock stack after the a-sync code executes. As an example, in case of a single-thread environment, the runtime's event loop may be constructed of a single thread, running time slots for asynchronous jobs. According to this example, the mid-hooks may be configured to "pop" or extract a top function frame (e.g., a UID thereof), before the asynchronous primitives are executed, and restore the function frame after termination of the asynchronous primitives.

One technical effect of the disclosed subject matter may be providing an efficient, automated logging system that tracks function calls, their callers, and associated endpoints with minimal performance impact. The disclosed subject matter enables users such as developers to automatically gather performance metrics regarding function calls, performance, execution times, or the like, supporting both synchronous and asynchronous executions.

Another technical effect of the disclosed subject matter may be providing comprehensive and enriched performance metrics that cannot be tracked using the call stack. For example, the disclosed subject matter enables to track asynchronous operations and to associated executions with their endpoint sources, which may be challenging or even infeasible to track using the call stack. In some cases, enriching the performance metrics that are provided to developers may enhance their error analyses, debugging processes, performance optimization, or the like.

Yet another technical effect of the disclosed subject matter may be providing a reduced-overload technique for tracking function calls, flows, and endpoints. In some exemplary embodiments, by introducing hooks into code elements of interest, function calls and endpoints may be continuously tracked with reduced overhead. For example, instead of loading the entire stack trace for each data point of interest, the tracking tool may utilize the mock stack to identify the calling function of any invoked function. Loading the mock stack may be faster by several orders of magnitude compared to generating a full stack trace at every point of interest, potentially reducing access time from milliseconds to nanoseconds. Resources may be further reduced as the number of times the mock stack is loaded may be reduced compared to stack traces. For example, the mock stack may be used to track only hooked functions, thereby saving computational and time resources.

Yet another technical effect of the disclosed subject matter may be introducing sampling techniques into the logging process, which saves communication and computational resources, without compromising on obtaining a full coverage of call flows. For example, using the disclosed subject matter, every new call flow that is firstly encountered will be captured, regardless of its uniqueness. Although the logging tool may not be full, due to the usage of sampling, it may over perform logging tools that perform a full capture, at least since it may enable to track previously untraceable data such as asynchronous operations and endpoint sources.

Yet another technical effect of the disclosed subject matter may be reducing bandwidth utilization of the performance metrics reporting process. In some exemplary embodiments, the reporting of performance parameters may be performed without reporting all the samples that were measured during the reported time window. In some exemplary embodiments, a report for the time window may be generated to encompass an aggregation of sampled measurements with respect to one or more contexts (e.g., an average execution time per call function and endpoint), thereby providing statistics useful as insights for developers while reducing the communication overhead.

Yet another technical effect of the disclosed subject matter may be enabling users to apply heuristic rules for sampling rates of performance parameters at runtime. In some exemplary embodiments, instead of using predefined statistics, heuristic rules may be applied by the hooks within the executed function, enabling dynamic decision making and tracking without making any code or version changes to the base code.

Yet another technical effect of the disclosed subject matter may be enabling to track asynchronous operations in dynamic interpreter-based languages. In some exemplary embodiments, in case the runtime environment is a multi-thread execution environment, non-dynamic, or the like, data corruption in accessing the mock stack can occur, and thread-safe techniques may be used to prevent data corruption in accessing the mock stack. For example, one or more thread-safe techniques such as atomic operations, mutexes, or the like, may be used to prevent data corruption of the mock stack, or any other logged data that is managed by the logging tool. In each of the above environments and languages, one or more entries of the mock stack may be captured and restored after the context switch ends.

Yet another technical effect of the disclosed subject matter may be improving the software development process, ultimately leading to more efficient and error-free code development. The disclosed subject matter enhances the development process by providing real-time tracking of function calls and endpoints, with reduced loading time. For example, by identifying an endpoint of a function with a bug, developers can make more informed decisions during software development. This may lead to code that performs better, has reduced number of errors, and considers various contextual factors, such as runtime environment, performance history, and potential conflicts with other developers' activities.

Yet another technical effect of the disclosed subject matter may be providing developers with comprehensive, low-overhead insights into application behavior, without requiring manual data collection or reliance on resource-intensive stack traces. The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Figure 2:
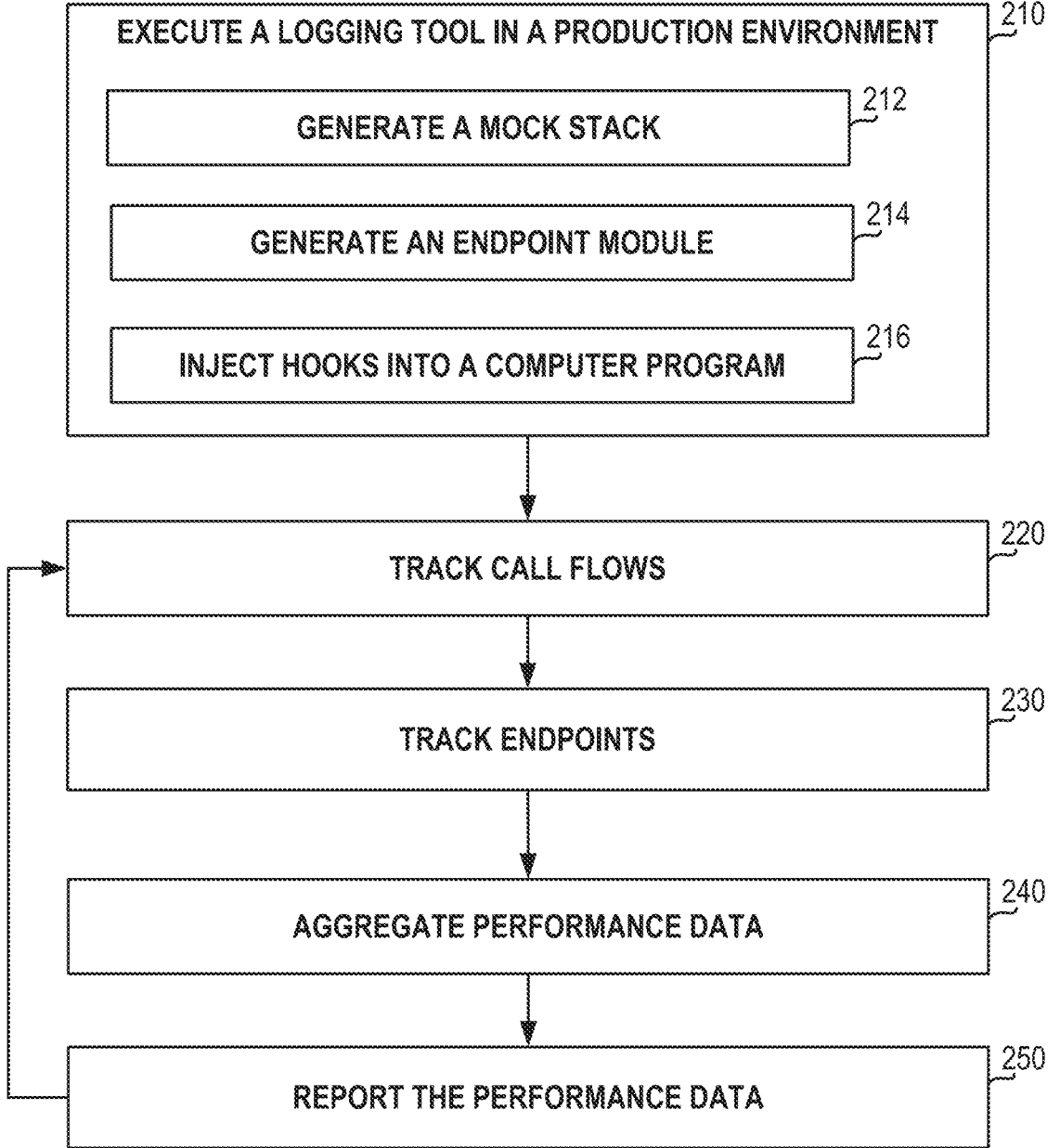
FIG. 2 shows a flowchart diagram of a method, in accordance with some exemplary embodiments of the disclosed subject matter.

Referring now to FIG. 2 showing an exemplary flowchart diagram of a method, in accordance with some exemplary embodiments of the disclosed subject matter.

On Step 210, a logging tool may be executed, employed, or the like, within a live production environment. The live production environment may be the set of computers where user-ready software is deployed and executed. The live product environment may be utilized to execute executable software, referred to as a "computer program", that was developed in a code base. For example, the computer program may be developed using an interpreter-based language, such as Ruby™, Python™, JavaScript™, or the like. In such a case, the executable software may be the code base (or portion thereof) that is configured to be executed by an interpreter. It is noted that the disclosed subject matter is not limited to a specific execution manner and may be applied to compiled binary code, code executed by an interpreter, code executed by a two-pass interpreter, hybrid code comprising portions executed in different manners, or the like.

In some exemplary embodiments, the product that is being executed may be a single executable file or a set of executable files that may be executed on a single computer, several computers, or the like. In other cases, the logging tool may be executed in any other environment, e.g., in a testing or development environment in which the software is being developed and/or tested until a version is developed and deployed to the live production environment.

In some exemplary embodiments, the logging tool may comprise a plurality of components. For example, the logging tool may be generated to comprise a mock stack, an endpoint module, and a plurality of hooks, e.g., according to Sub-Steps 212-216.

On Sub-Step 212, the logging tool may be generated to comprise a mock stack. In some exemplary embodiments, the mock stack may be configured to allow the logging tool to track function executions of the computer program. In some exemplary embodiments, the mock stack may maintain indications of the function executions, while ordering the indications in a manner that resembles a call stack, which may enable the logging tool to track function executions.

In some exemplary embodiments, the mock stack may be maintained within a memory region belonging to a process executing the computer program. In some exemplary embodiments, the memory region may be separate from any memory allocated to a call stack of the process, and may not overlap therewith. For example, the mock stack may be stored as within a data segment of the process, within a heap of the process, or the like.

In some exemplary embodiments, the mock stack may maintain indications of the registered function executions, using unique identifiers of each function. For example, a pre-hook of a function may identify a function identifier in a top of the mock stack as its caller function, and report the caller function and the current function to the logging tool. In one scenario, such as in case of recursive function calls, each call may be recorded as a separate entry in the mock stack using the same identifier.

On Sub-Step 214, the logging tool may be generated to comprise an endpoint module. In some exemplary embodiments, the endpoint module may be configured to allow the logging tool to track invocations of endpoints, e.g., using frameworks such as Express™. In some exemplary embodiments, the endpoint module may maintain indications of the endpoint invocations within the memory region, e.g., the same memory region that is used to maintain the mock stack, a separate memory region that is disjoint from the call stack, or the like. For example, the mock stack and the endpoint module may be implemented as first and second global variables, respectively, within the data segment of the process.

On Sub-Step 216, a plurality of hooks may be embedded within functions of interest of the computer program.

In some exemplary embodiments, the hooks may be instrumented into the code during a pre-preparation stage. For example, the pre-preparation stage may encompass a static analysis of the code, during which each function's code is statically inspected. For example, the inspection may rely on syntax pattern matching, Abstract Syntax Tree (AST) parsing, bytecode analysis, or the like. In some exemplary embodiments, the functions of interest may be opt-in or selected by a user such as a developer, selected automatically, or the like. For example, an automatic script or a developer may analyze the code to identify points of interest such as functions of interest, event handlers, exception handlers, operation points, logical context switches, asynchronous control flow constructs, indirect invocation patterns, scheduled callbacks, promises, or the like, and hooks may be injected in the points of interest. In some cases, all the source code of the user may be automatically hooked, and the user may opt-in which libraries are of interest. For example, the user may desire to hook or wrap only headers of libraries in order to detect certain bugs. In some exemplary embodiments, code sections that are not of interest to the user may not necessarily be hooked, and the user may have control over which functions and libraries are instrumented.

In some exemplary embodiments, during the pre-preparation stage, libraries incorporated by the program's code may or may not be instrumented, e.g., depending on whether or not they are of interest. For example, the user may determine whether to opt-in and instrument each third-party library. As another example, one or more default rules or settings may be applied to determine which third-party libraries should be instrumented. In some exemplary embodiments, during the pre-preparation stage, in addition to instrumenting functions of interest, endpoint-routing frameworks such as Express™ may or may not be instrumented with one or more endpoint hooks.

In some exemplary embodiments, the hooks may be configured to create and/or adjust the mock stack and endpoint module. In some exemplary embodiments, different types of hooks may interact with different parts of the logging tool. For example, instrumentations of functions of interest may be configured to interact with the mock stack to track function call relationships, while endpoint hooks embedded within endpoint-routing frameworks may interact with the endpoint module during program execution to reflect the active endpoints. For example, since the mock stack and the endpoint module may be maintained in the process memory, e.g., as global variables, they may be accessible to all functions and endpoint hooks.

In some exemplary embodiments, the program's code may be embedded with wrappers or instrumentation at various points, such as the start and end of each function, at one or more intermediate points, or the like. In some exemplary embodiments, the hooks may comprise pre-hooks and post-hooks used to instrument the functions of interest, as well as mid-hooks for handling asynchronous primitives. In some cases, the program's code may be written in an interpreter-based language, which may enable to instrument uncompiled source code. In other cases, the program's code may be written in any other type of language.

In some exemplary embodiments, the logging tool, using one or more hooks, may be configured to add an indication of a function to the mock stack upon execution of the function, and to remove the indication after the execution is completed. For example, a pre-hook of a function may register the function to the mock stack (e.g., using a unique identifier of the function), while a post-hook may remove this registration after the execution terminates.

In some exemplary embodiments, the logging tool, via one or more hooks, may be configured to add an indication of an endpoint to the endpoint module upon invocation of the endpoint, and to remove the indication after one or more chains of function calls invoked by the endpoint, complete a termination.

In some exemplary embodiments, mid-hooks may be used for maintaining the mock stack's state during asynchronous operations. In some exemplary embodiments, mid-hooks may be embedded prior to an asynchronous primitive of a function, such as the "await" primitive, and may be invoked mid-execution of the function. In some exemplary embodiments, a mid-hook may be configured to extract an indication of one or more most recent functions from the mock stack before the asynchronous primitive is executed, and to restore the indication after termination of the asynchronous primitive.

On Step 220, the logging tool may utilize its components to accumulate data regarding calling functions of executed functions, call flows of function executions, endpoints that triggered executed functions, or the like. In some exemplary embodiments, the data may be accumulated from the mock stack and the endpoint module, e.g., by the hooks, or by any other entity.

In some exemplary embodiments, in order to identify the caller of an active function, the logging tool (e.g., via a pre-hook) may be configured to load, read or process a most recent entry of the mock stack, e.g., the "top" entry of the mock stack. For example, the top entry of the mock stack may comprise the latest function that registered to the mock stack, which may constitute a direct or indirect caller of the current function.

In some exemplary embodiments, a call flow may comprise the path from a calling function to the invoked function and may be identified based on the mock stack, e.g., by reading or accessing the two top entries of the mock stack (e.g., according to a LIFO order). In some exemplary embodiments, the logging tool may determine whether an identified call flow is new for an invoked function of interest (that is hooked). For example, a call flow may be considered new if it is firstly encountered, e.g., if not identified before during a reporting time window of the logging tool. In some exemplary embodiments, the logging tool may count the number of occurrences of each call flow within the reporting time window. In some exemplary embodiments, call flows may be identified and statistics thereof may be gathered only for pairs of caller-callee, without tracking longer sequences. In other cases, any other length of call flows may be tracked.

On Step 230, the logging tool may determine which endpoints triggered the invocation of each function, e.g., based on information in the endpoint module. In some exemplary embodiments, the logging tool may associate each executed function with all relevant endpoints (also referred to as "active endpoints") that triggered the chain of calls that led to the function's execution. In some exemplary embodiments, the active endpoints of an invoked function may be identified and statistics thereof may be gathered, independently from the call flow statistics.

In some exemplary embodiments, the logging tool may determine endpoint flows of each function. In some exemplary embodiments, an endpoint flow may comprise the active endpoints of the function, and the function itself, without the path or chain of function calls in between.

On Step 240, the logging tool may aggregate determined data from the mock stack and the endpoint module, such as the call flows that occurred, a number of occurrences of each call flow, active endpoints associated with each function execution, or the like. In some exemplary embodiments, the logging tool may gather statistics, or performance metrics, regarding each executed function, each call flow that is identified, each endpoint flow (including the active endpoints of a function and the function itself, without any intermediate function calls), or the like.

In some exemplary embodiments, the logging tool may apply various sampling rates to function executions, which may be adjusted dynamically. For example, if a call flow is new or if an exception occurs during execution, the sampling rate may be increased from a first rate to a second, higher rate (e.g., a rate of 100%). In some exemplary embodiments, new call flows that are firstly encountered within a reporting time window, may be fully measured, in order to ensure that the call graph of the functions of interest is complete. In one scenario, the logging tool may determine that a call flow of a function is firstly encountered, and in response to this determination, perform a complete data collection of an execution of the function. According to this scenario, subsequent identifications of the same call flow may be sampled with one or more sampling rates, e.g., thereby performing an incomplete data collection with a gradually decreasing sampling rate as a number of invocations of the call flow increases.

In some exemplary embodiments, the logging tool may selectively sample performance data over a defined time window and aggregate this sampled data over the defined time window. For example, a call flow may be considered new if firstly encountered and didn't occur in the current time window, even if it did occur in a previous time window.

In some cases, the selection and adjustment of a function's sampling rate may be performed by one of its hooks, e.g., the pre-hook, a mid-hook, the post-hook, or the like. For example, the hook may comprise code defining how to select and adjust the sampling rate. For example, a function may have a first sampling rate for a first call flow and a second sampling rate for a second call flow.

In some exemplary embodiments, the sampling rate may be adjusted dynamically based on one or more rules, statistical modules, heuristic rules, or the like. For example, the sampling rate may be adjusted dynamically based on the execution environment, the execution history, the flow, the stability of the function's performance parameters, whether or not the flow is new, or the like. For example, the stability of the performance parameters may be measured based on the number of executions of the current flow, based on one or more signal stability algorithms such as Least Mean Squares (LMS), Kalman Filter, Particle Filter, or the like.

In some exemplary embodiments, the aggregated data may comprise performance metrics such as overall average execution time of a function (e.g., excluding the execution time of its hooks) across all call flows and endpoints, an average execution time for specific call flows or endpoint flow, computational resource consumption by the function execution per specific call flows or endpoint flow, a memory usage of the function (in general or per flow), statistical deviations, or the like. In some exemplary embodiments, the performance metrics may comprise when a code element runs in production and its frequency of runs, statistical measures such as median and percentiles (e.g., 90th percentile) of different time bins (hourly, weekly), duration, CPU load, network load, local storage load, a sum of a squared execution duration, a standard deviation of the execution durations, sketch data for estimating percentiles incrementally, or the like.

In some exemplary embodiments, performance metrics of interest may be selected by a user, configured automatically using default settings, or the like.

In some exemplary embodiments, sampling only part of the executions may result in incomplete statistics. In some exemplary embodiments, one or more approximations and/or statistical analyses may be performed in order to extrapolate missing data. In some exemplary embodiments, the logging tool may determine, or extrapolate the performance metrics by determining total invocation counts of a function, sampled invocation counts of the function, and by using ratios between these to extrapolate overall statistics of the function. For example, a sketch rate may be used to calculate a median metric, such as by "flattening" the data to approximate the median based on partial data.

In some cases, if a callee is not hooked, it may not be included in any monitored flow. For example, such functions may not be registered at the mock stack or the endpoint module, and thus may not be tracked. For example, in case a user is not interested in tracking a performance of a specific first function, $f1$, the function may not be instrumented. According to this example, in case $f0$ calls $f1$, and $f1$ calls $f2$, if $f0$ and $f2$ are instrumented, the logging tool may register this sequence of calls as $f0$ calling $f2$, although the call is not direct. In such cases, the call flow that is recorded may be $f0$ calling $f2$.

In some exemplary embodiments, the logging tool may process and aggregate statistics and performance parameters separately for calls flows and endpoint flows. For example, a user may wish to obtain an execution time of a code element, such as a function $f$, and determine how the execution time is affected by its flow. According to this scenario, $f$ may be invocable from different endpoints, and from different call functions. According to this example, the logging tool may provide separate execution time statistics for each flow.

On Step 250, the logging tool may report the aggregated data, e.g., the performance metrics, to a server. In some exemplary embodiments, the reporting may be performed periodically, typically within a given time window, for each function and per flow.

In some exemplary embodiments, the logging tool may employ various strategies to balance comprehensive data collection with system performance. In some exemplary embodiments, in order to reduce bandwidth utilization, the logging tool may report aggregated measurements of Step 240 rather than all individual samples collected during the reporting window. For example, only aggregated measurements that were indicated by a user as parameters of interest may be reported.

In some exemplary embodiments, after the aggregated data is reported, the performance data in memory may be initialized or removed to prepare for the next cycle of data collection.

In some exemplary embodiments, the server may or may not utilize the reported data to generate one or more insights, and embed such insights into an Integrated Development Environment (IDE) of a developer. For example, an IDE may be a software application that provides a set of tools for software development, and facilitates the creation, modification, testing, debugging, and deployment of software programs in one or more programming languages. The IDE may also support various software development methodologies, such as agile, waterfall, or test-driven development.

The IDE may comprise a user interface that allows the user to interact with the various tools and features of the IDE. The user interface may include a code editor, a compiler, a debugger, a terminal, a version control system, a code navigator, a code generator, a code analyzer, a code formatter, a code refactoring tool, a code documentation tool, a code testing tool, a code deployment tool, and other tools that assist the user in software development. The user interface may also provide graphical representations of the software program, such as flowcharts, diagrams, or user interface mockups.

The IDE may be configured to support one or more programming languages, such as Java™, Python™, C#™, C++™, JavaScript™, PHP™, Ruby™, or Swift™. The IDE may also be configured to support one or more programming paradigms, such as object-oriented, functional, procedural, or declarative. The IDE may also be configured to support one or more programming platforms, such as web, mobile, desktop, cloud, or embedded. The IDE may also be configured to support one or more programming frameworks, such as Node.js™, Angular™, React™, Django™, Laravel™, Spring™, or Flutter™. The IDE may also be configured to support one or more programming standards, such as HTML, CSS, XML, JSON, or SQL.

Figure 3:
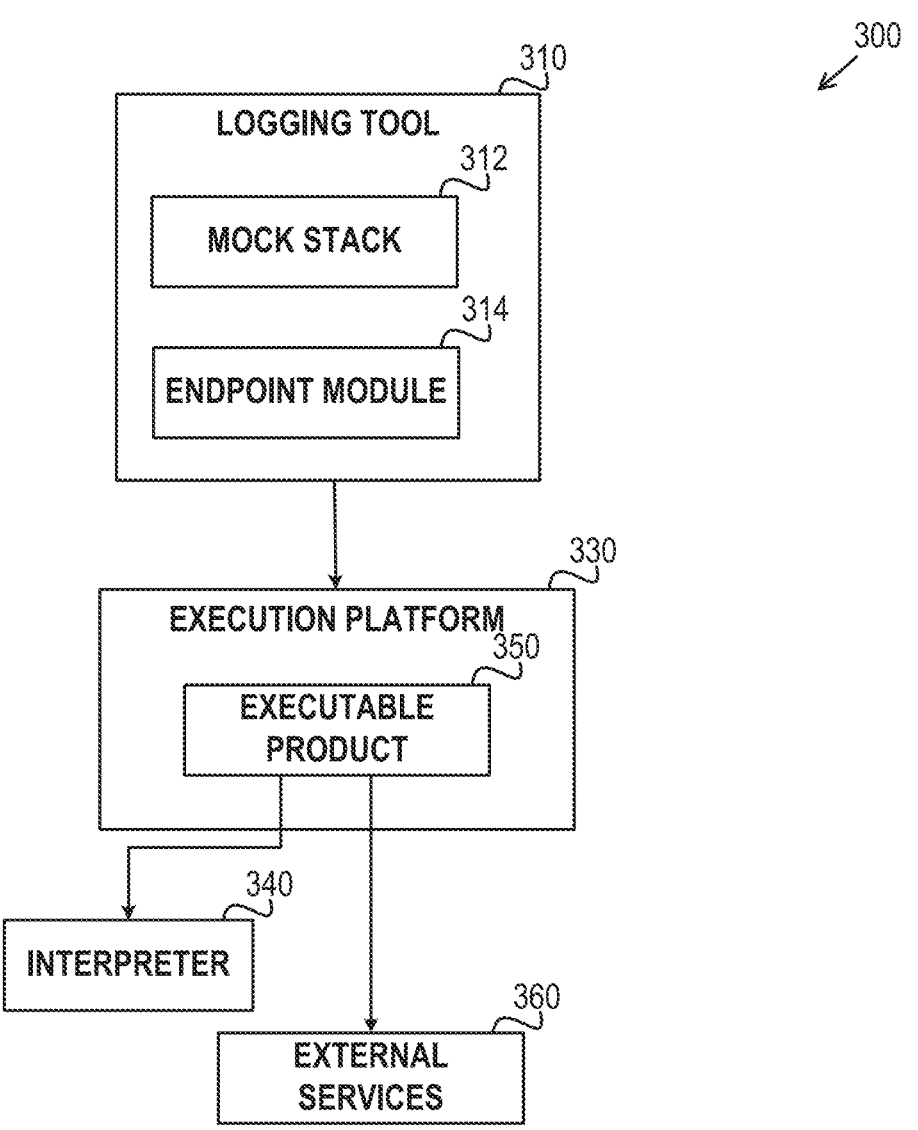
FIG. 3 shows a computerized environment, in accordance with some exemplary embodiments of the disclosed subject matter.

Referring now to FIG. 3 showing a block diagram of a system that utilizes the logging tool, in accordance with some exemplary embodiments of the disclosed subject matter.

In some exemplary embodiments, the system may comprise a Live Production Environment 300 where software is deployed and executed. Live Production Environment 300 may be an actual operational environment where finalized and tested software, applications, or systems are deployed and made available to end-users.

In some exemplary embodiments, Live Production Environment 300 may comprise an Execution Platform 330 that executes deployed software, referred to as the Executable Product 350. In some exemplary embodiments, Executable Product 350 may result from compilation or, for interpreter-based languages, may be the source code itself interpreted at runtime. Execution Platform 330 may be one or more server, computer nodes, processors, or the like, that are used for executing Executable Product 350.

In some exemplary embodiments, Executable Product 350 may be instrumented automatically, semi-automatically, or the like. For example, a user may opt-in code elements of interest, and a script may be executed to automatically inject pre-hooks, post-hooks, mid-hooks, or the like, into selected code elements. In other cases, Executable Product 350 may be instrumented without user input, such as by injecting a plurality of hooks into all code elements, into an automatic selection of code elements according to one or more default settings or rules, or the like.

In some exemplary embodiments, a Logging Tool 310 may be deployed within Live Production Environment 300, and may be configured to monitor and analyze the execution of Executable Product 350. In some exemplary embodiments, Logging Tool 310 may comprise a library, agent, runtime extension, or the like, and may be maintained within a heap of the process memory, the code segment of the process memory, a text segment of the shared library's memory region, or the like. In some exemplary embodiments, Logging Tool 310 may be executed within Live Production Environment 300 (e.g., by the event loop in asynchronous systems).

In some exemplary embodiments, Logging Tool 310 may record a log with production information regarding various aspects of the code elements. For example, Logging Tool 310 may record performance parameters associated with invocation rate, execution times, and cross-service interactions, or the like, e.g., using a Mock Stack 312 and an Endpoint Module 314. In some exemplary embodiments, Logging Tool 310 may comprise at least the Mock Stack 312 and the Endpoint Module 314. In some exemplary embodiments, Logging Tool 310 may comprise the injected hooks within Executable Product 350.

In some exemplary embodiments, Mock Stack 312 may comprise a custom data structure that tracks function executions by maintaining indications of these executions in a memory region separate from the process's call stack. For example, Mock Stack 312 may reside as a global variable within the heap, within the data segment, or the like.

In some exemplary embodiments, Endpoint Module 314 may comprise a separate custom data structure that tracks invocations of endpoints, storing this information in the same memory region as Mock Stack 312.

In some exemplary embodiments, Live Production Environment 300 may comprise External Services 360, representing third-party services or APIs with which the Executable Product 350 interacts during execution. External Services 360 may be a third-party service, platform, or software component that is accessed via APIs or other means to perform specific tasks or functionalities required by the Executable Product 350. External Services 360 may be a third-party SaaS service being called by Executable Product 350. For interpreter-based languages, an Interpreter 340 may be present to interpret and execute the code within the Execution Platform 330.

In some exemplary embodiments, Logging Tool 310 may interact with the components of Live Production Environment 300, capturing detailed information about function calls, call flows, and endpoint invocations. In some exemplary embodiments, Logging Tool 310 may utilize sampling techniques to balance comprehensive data collection with minimal performance impact. In some exemplary embodiments, Logging Tool 310 may or may not perform dynamic adjustments to sampling rates, per function or per code element.

In some exemplary embodiments, Logging Tool 310 may perform function call tracking, performance monitoring, and data collection in the Live Production Environment 300. In some exemplary embodiments, Logging Tool 310 may utilize Mock Stack 312 and Endpoint Module 314 to provide detailed insights into the software's runtime behavior, offering valuable data for performance analysis and optimization while minimizing the impact on the running system.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random-access memory (RAM), a read-only memory (ROM), an erasable programmable read-only memory (EPROM or Flash memory), a static random access memory (SRAM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Local Area Network (LAN), and a Wide Area Network (WAN). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, aspect oriented programming language, procedural programming language, or the like. The computer readable program instructions may execute entirely on the user's computer, partly on the user's computer, as a stand-alone software package, partly on the user's computer and partly on a remote computer or entirely on the remote computer or server. The remote computer may be connected to the user's computer through any type of network, including a LAN, a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments.

What is claimed is:

1. A method comprising:
initializing a mock stack of a logging tool, the mock stack is initialized within a data segment belonging to a process executing a computer program, the data segment is separate from a stack segment used for a call stack of the computer program, the process is executed within the live production environment;

tracking, by the mock stack, function executions of the computer program and maintaining indications of the function executions within the data segment;

tracking, by an endpoint module, invocations of endpoints and the maintaining indications of the invocations within the data segment;

interacting, by a plurality of hooks, that are embedded within functions of interest of the computer program, with the mock stack and the endpoint module during execution of the computer program;

determining, by the logging tool, for an invocation of a function that is hooked by a hook of the plurality of hooks, whether a call flow of the function is firstly encountered, wherein the call flow of the function comprises a flow from a calling function of the functions of interest that invoked the function to the function, wherein the call flow of the function is identified based on the mock stack; and determining, by the logging tool, at least one endpoint that triggered the invocation of the function, based on the endpoint module.

2. The method of claim 1, further comprising:
counting, by the logging tool, a number of occurrences of the call flow within a reporting time window; and
reporting the number to a server after the reporting time window elapses.

3. The method of claim 1, further comprising:
adding an indication of the function, by the logging tool, to the mock stack upon the invocation of the function; and
removing, by the logging tool, the indication upon execution termination of the function.

4. The method of claim 1, further comprising:
adding, by the logging tool, an indication of an endpoint to the endpoint module upon invocation of the endpoint; and
removing, by the logging tool, the indication after one or more chains of function calls invoked by the endpoint, complete a termination.

5. The method of claim 4, wherein the endpoint comprises at least one of:
an API;
a service entry point;
a cron job;
a queue management service; and
a webhook.

6. The method of claim 1, wherein the function is part of a chain of function calls that is triggered by multiple endpoints, and the method further comprising:
adding indications of the multiple endpoints to the endpoint module; and
associating the function with the multiple endpoints.

7. The method of claim 1, wherein the mock stack and the endpoint module are implemented as first and second global variables, respectively, within a data segment of the process.

8. The method of claim 1, wherein the mock stack and the endpoint module are maintained within a heap of the process.

9. The method of claim 1, wherein the indications of the function executions comprise unique identifiers that uniquely identify each of the functions of interest upon execution.

10. The method of claim 1, further comprising performing a complete data collection of an execution of the function upon determining that the call flow of the function is firstly encountered;

setting a sampling rate for the function upon determining that a subsequent call flow of the function was already encountered, thereby performing an incomplete data collection, the subsequent call flow comprises the flow from the calling function to the function, the subsequent call flow is invoked after the call flow.

11. The method of claim 10, wherein the sampling rate for the function is configured to gradually decrease as a number of invocations of the call flow increases.

12. The method of claim 1, further comprising:

applying a first sampling rate for the function; and upon determining that an exception occurs during an execution of the function, adjusting the first sampling rate to a second sampling rate, the second sampling rate is greater than the first sampling rate.

13. The method of claim 1, further comprising:

selectively sampling performance data of invocations of the function over a defined time window;

aggregating sampled performance data over the defined time window, thereby obtaining aggregated data, wherein the aggregated data comprises at least the number of occurrences of the call flow and performance data of the occurrences of the call flow; and transmitting the aggregated data to a server.

14. The method of claim 13, wherein the performance data comprises at least one of:

an overall average execution time of the function over all call flows and endpoints;

an average execution time of the function for the call flow;

an average execution time of the function for the endpoint;

a percentile execution time of the function over all call flows and endpoints;

a percentile execution time of the function for the call flow;

a percentile execution time of the function for the endpoint;

computational resource consumption of the function; and a memory usage of the function.

15. The method of claim 14, further comprising:

determining a total invocation count of the function;

determining a sampled invocation count of the function; and calculating the overall average execution time based on a ratio between the total invocation count and the sampled invocation count.

16. The method of claim 1, wherein the plurality of hooks comprises a plurality of pre-hooks and post-hooks, wherein the pre-hooks and post-hooks are used to instrument the functions of interest, wherein the pre-hooks are configured to register the functions of interest to the mock stack, wherein the post-hooks are configured to remove registrations of the functions of interest after their executions terminate.

17. The method of claim 1, wherein the plurality of hooks comprises a mid-hook that is embedded prior to an asynchronous primitive of the function, wherein the mid-hook is configured to be invoked mid-execution of the function, wherein the mid-hook is configured to extract an indication of the function from the mock stack before the asynchronous primitive is executed, and to restore the indication after termination of the asynchronous primitive.

18. A system comprising a processor and coupled memory, said processor is adapted to execute a logging tool within a live production environment, said processor being adapted to:

instrument a computer program with a plurality of hooks, the plurality of hooks is embedded within functions of interest of the computer program;

initialize a mock stack of the logging tool, the mock stack is initialized within a data segment belonging to a process executing the computer program, the data segment is separate from a stack segment used for a call stack of the computer program, the process is executed within the live production environment;

track, using the mock stack, function executions of the computer program and maintain indications of the function executions;

initialize an endpoint module in the data segment, track, using the endpoint module invocations of endpoints and maintain indications of the invocations, direct the plurality of hooks to interact with the mock stack and with the endpoint module during execution of the computer program;

determine, for an invocation of a function that is hooked by a hook of the plurality of hooks, whether a call flow of the function is firstly encountered, wherein the call flow of the function comprises a flow from a calling function that invoked the function to the function, wherein the call flow of the function is identified based on the mock stack; and determine, based on the endpoint module, at least one endpoint that triggered the invocation of the function.

19. The system of claim 18, wherein the functions of interest are selected by a user.

20. A computer program product comprising a non-transitory computer readable medium retaining program instructions, which program instructions when read by a processor, cause the processor to execute a logging tool within a live production environment, said processor being adapted to:

instrument a computer program with a plurality of hooks, the plurality of hooks is embedded within functions of interest of the computer program;

initialize a mock stack of the logging tool, the mock stack is initialized within a data segment belonging to a process executing the computer program, the data segment is separate from a stack segment used for a call stack of the computer program, the process is executed within the live production environment;

track, using the mock stack, function executions of the computer program and to maintain indications of the function executions;

initialize an endpoint module in the data segment;

track, using the endpoint module, invocations of endpoints and maintain indications of the invocations;

direct the plurality of hooks to interact with the mock stack and with the endpoint module during execution of the computer program;

determine, for an invocation of a function that is hooked by a hook of the plurality of hooks, whether a call flow of the function is firstly encountered, wherein the call flow of the function comprises a flow from a calling function that invoked the function to the function, wherein the call flow of the function is identified based on the mock stack; and determine, based on the endpoint module, at least one endpoint that triggered the invocation of the function.

* * * * *